G. W. PRICE.
HOSE-COUPLING.

No. 176,241.　　　　　　　　　　Patented April 18, 1876.

WITNESSES:
O. Neveux
John Goethals

INVENTOR:
G. W. Price
BY
　　　　
ATTORNEYS.

N. PETERS, PHOTO-LITHOGRAPHER, WASHINGTON, D C.

UNITED STATES PATENT OFFICE.

GEORGE W. PRICE, OF SAN FRANCISCO, CALIFORNIA.

IMPROVEMENT IN HOSE-COUPLINGS.

Specification forming part of Letters Patent No. 176,241, dated April 18, 1876; application filed January 29, 1876.

*To all whom it may concern:*

Be it known that I, GEORGE W. PRICE, of the city and county of San Francisco, California, have invented a new and Improved Hose-Coupling, of which the following is a specification:

The invention consists of a tapered ring outside of the hose, and screwing into one of the parts of the coupling over another tapered ring inside of the hose, so as to bind the hose and thus attach it to the coupling; and it also consists of a kind of detachable hinge-joint at one side of the coupling, and sliding keys and hooks at the other side, for fastening the two parts of the coupling, all as hereinafter described.

Figure 1:
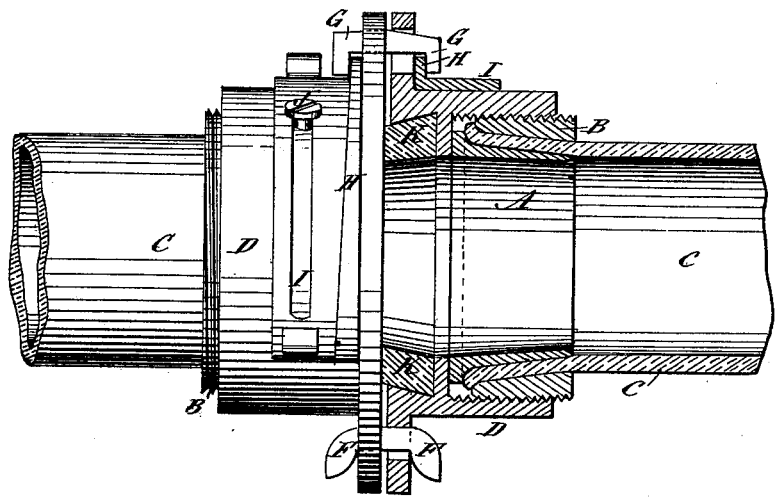
Figure 2:
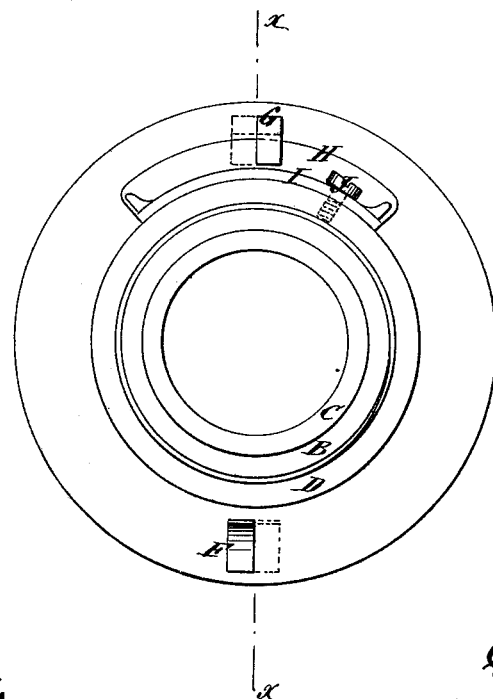

Figure 1 is partly a side elevation and partly a longitudinal section of my improved coupling, and Fig. 2 is an end elevation.

Similar letters of reference indicate corresponding parts.

A is the inside tapered ring, and B the outside tapering ring, between which the hose C is attached to the coupling D by screwing ring B into the coupling, so as to bind the hose fast on ring A, thus making a simple but substantial contrivance for attaching the coupling to the hose.

E represents a kind of hook, by which the flanges are detachably hinged together at one side, and G represents permanent hooks on the opposite side of the coupling, by which the latter are fastened with keys H, the keys being fitted on the couplings by a slotted flange, I, and a screw, J, so as to be connected, for keeping them in position for use, and at the same time allowing them to slide freely.

One of the couplings has a spring, K, of elastic material, fitted in the end to be compressed against the face of the flange of the other coupling, to pack the joint tightly.

Having thus described my invention, I claim as new and desire to secure by Letters Patent—

1. In hose-couplings, the circular wedge B, screwed in holder over the hose, and holding its end against a shoulder of the ring A, as shown and described, for the purpose specified.

2. The detachable hook E, permanent hooks G, and the keys H, combined with the hose-coupling, substantially as specified.

3. The combination of packing K with couplings D, hooks E G, and keys H, substantially as specified.

GEORGE W. PRICE.

Witnesses:
 JOHN DENNETT,
 H. B. ROGERS.